US011410553B2

(12) United States Patent
Zhao et al.

(10) Patent No.: US 11,410,553 B2
(45) Date of Patent: Aug. 9, 2022

(54) PARKING MANAGEMENT DEVICE, SYSTEM AND METHOD

(71) Applicant: BOE TECHNOLOGY GROUP CO., LTD., Beijing (CN)

(72) Inventors: Tianyue Zhao, Beijing (CN); Qi Zeng, Beijing (CN); Xitong Ma, Beijing (CN); Weiguo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 655 days.

(21) Appl. No.: 16/340,581

(22) PCT Filed: Aug. 31, 2018

(86) PCT No.: PCT/CN2018/103579
§ 371 (c)(1),
(2) Date: Apr. 9, 2019

(87) PCT Pub. No.: WO2019/144622
PCT Pub. Date: Aug. 1, 2019

(65) Prior Publication Data
US 2021/0343145 A1    Nov. 4, 2021

(30) Foreign Application Priority Data
Jan. 26, 2018    (CN) .................. 201810078685.X

(51) Int. Cl.
*B60Q 1/48* (2006.01)
*G08G 1/14* (2006.01)
(Continued)

(52) U.S. Cl.
CPC .............. *G08G 1/142* (2013.01); *G06T 7/60* (2013.01); *G06T 7/73* (2017.01); *G06V 20/54* (2022.01);
(Continued)

(58) Field of Classification Search
CPC .... G08G 1/142; G08G 1/146; G06K 9/00785; G06K 2209/23; G06T 7/60; G06T 7/73;
(Continued)

(56) References Cited

U.S. PATENT DOCUMENTS

| | | | | |
|---|---|---|---|---|
| 5,504,314 A | * | 4/1996 | Farmont | ............... G07B 15/04 |
| | | | | 235/384 |
| 10,170,003 B2 | * | 1/2019 | Boss | ..................... G08G 1/143 |

(Continued)

FOREIGN PATENT DOCUMENTS

| | | |
|---|---|---|
| CN | 102945617 A | 2/2013 |
| CN | 204440662 U | 7/2015 |

(Continued)

OTHER PUBLICATIONS

Office action from Chinese Application No. 201810078685.x dated Jan. 5, 2021.

(Continued)

*Primary Examiner* — Toan N Pham
(74) *Attorney, Agent, or Firm* — Calfee, Halter & Griswold LLP

(57) ABSTRACT

The disclosure provides a parking management system including: a central control device configured to centrally manage the division and dispatch of a parking space; and at least one projection device configured to project and display the range of the parking space to assist the parking of a vehicle in response to the division and dispatch of the parking space by the central control device. The disclosure further provides a corresponding parking management method.

18 Claims, 4 Drawing Sheets

(51) Int. Cl.
- *G06T 7/73* (2017.01)
- *G06T 7/60* (2017.01)
- *G07B 15/02* (2011.01)
- *H04N 7/18* (2006.01)
- *G06V 20/54* (2022.01)

(52) U.S. Cl.
CPC ............ *G07B 15/02* (2013.01); *G08G 1/146* (2013.01); *H04N 7/188* (2013.01); *G06V 2201/08* (2022.01)

(58) Field of Classification Search
CPC ........ G07B 15/02; H04N 7/188; B60Q 1/488; B60Q 5/006; B62D 15/027
See application file for complete search history.

(56) References Cited

U.S. PATENT DOCUMENTS

| | | | |
|---|---|---|---|
| 10,198,006 B2* | 2/2019 | Kazama | G05D 1/0287 |
| 2006/0253226 A1* | 11/2006 | Mendelson | H04W 4/02 |
| | | | 701/1 |
| 2012/0236149 A1 | 9/2012 | Nagy | |
| 2013/0222157 A1 | 8/2013 | Fukushima | |
| 2015/0138001 A1* | 5/2015 | Davies | G08G 1/0175 |
| | | | 340/932.2 |
| 2017/0341640 A1 | 11/2017 | Liu | |
| 2018/0018870 A1 | 1/2018 | Sehra et al. | |
| 2020/0242924 A1* | 7/2020 | Publicover | G08G 1/147 |

FOREIGN PATENT DOCUMENTS

| | | |
|---|---|---|
| CN | 105575171 A | 5/2016 |
| CN | 105741360 | 7/2016 |
| CN | 106601020 A | 4/2017 |
| CN | 106781667 | 5/2017 |
| CN | 107415940 A | 12/2017 |
| CN | 107437341 | 12/2017 |
| CN | 108492574 A | 9/2018 |
| JP | H04371678 A | 12/1992 |
| KR | 20090017733 | 2/2009 |
| WO | 2017057053 A1 | 4/2017 |

OTHER PUBLICATIONS

Search Report and Written Opinion for International Application No. PCT/CN2018/103579 dated Oct. 18, 2018.

First Office Action for Chinese Patent Application No. 201810078685.X dated Apr. 23, 2020.

Search Report from European Application No. 18859965.8 dated Sep. 13, 2021.

* cited by examiner

PARKING MANAGEMENT DEVICE, SYSTEM AND METHOD

RELATED APPLICATIONS

The present application is the U.S. national phase entry of PCT/CN2018/103579, with an international filing date of Aug. 31, 2018, which claims the benefit of Chinese Patent Application No. 201810078685.X filed on Jan. 26, 2018, the entire disclosures of which are incorporated herein by reference.

TECHNICAL FIELD

The disclosure relates to the parking field, and in particular, to an intelligent parking management system and method.

BACKGROUND

With the progress of society and the improvement of people's living standards, automobiles are getting more and more popular in people's lives, and the resulting difficulty of parking in cities is becoming a common problem faced by all countries in the world today. Countries, whether developed or developing, especially China where the urbanization process continues to accelerate, suffer from serious asymmetry of parking lot capacity and automobile ownership and low technology content of parking lot equipments. Such a problem results in increased time cost of people's lives and reduces the overall efficiency of society.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. In addition, the claimed subject matter is not restricted to embodiments that resolve any or all of the drawbacks mentioned in any part of the disclosure.

An exemplary embodiment provides a parking management system including: a central control device configured to centrally manage the division and dispatch of a parking space; and at least one projection device configured to project and display the range of the parking space to assist the parking of a vehicle in response to the division and dispatch of the parking space by the central control device.

In an exemplary embodiment, the parking management system further includes: a first camera configured to obtain the size information of the vehicle; wherein the central control device divides and dispatches the parking space based on the size information of the vehicle.

In an exemplary embodiment, the parking management system further includes: a first camera configured to obtain the model information of the vehicle; and a database in which is stored a mapping table between model information and size information of vehicles; wherein the central control device obtains corresponding size information from the database based on the model information of the vehicle and divides and dispatches the parking space based on the size information of the vehicle.

In an exemplary embodiment, the central control device is further configured to obtain from the vehicle its size information.

In an exemplary embodiment, the parking management system further includes: a second camera configured to obtain the actual parking position of the vehicle; wherein the central control device determines the charge for the vehicle based on the actual parking position of the vehicle and the division and dispatch of the parking space.

In an exemplary embodiment, the central control device determines the remaining parking spaces based on the actual parking position of the vehicle in order to divide and dispatch other parking spaces.

In an exemplary embodiment, when determining that the vehicle is not in the range of the parking space, the central control device causes the projection device to display an alert.

In an exemplary embodiment, the dispatch instructs a user via sound or image.

In an exemplary embodiment, the projection device is arranged to be movable on a track to project and display different parking spaces.

In an exemplary embodiment, the parking management system further includes: a pressure sensor configured to detect whether there is a vehicle entering; wherein in response to the detection that there is a vehicle entering, the first camera is activated to obtain the information of the vehicle.

In an exemplary embodiment, the central control device performs pre-allocation of parking spaces for the remaining parking spaces based on multiple factors, wherein priority weights with different orders of magnitude are set for different factors to determine the allocation order of the remaining parking spaces.

Another exemplary embodiment provides a parking management method including: dividing and dispatching a parking space by a central control device; and projecting and displaying the range of the parking space by a projection device to assist the parking of a vehicle in response to the division and dispatch of the parking space.

BRIEF DESCRIPTION OF THE DRAWINGS

These and other features of the general inventive concept will become better understood with regard to the following description and accompanying drawings in which.

DETAILED DESCRIPTION

Figure 1:
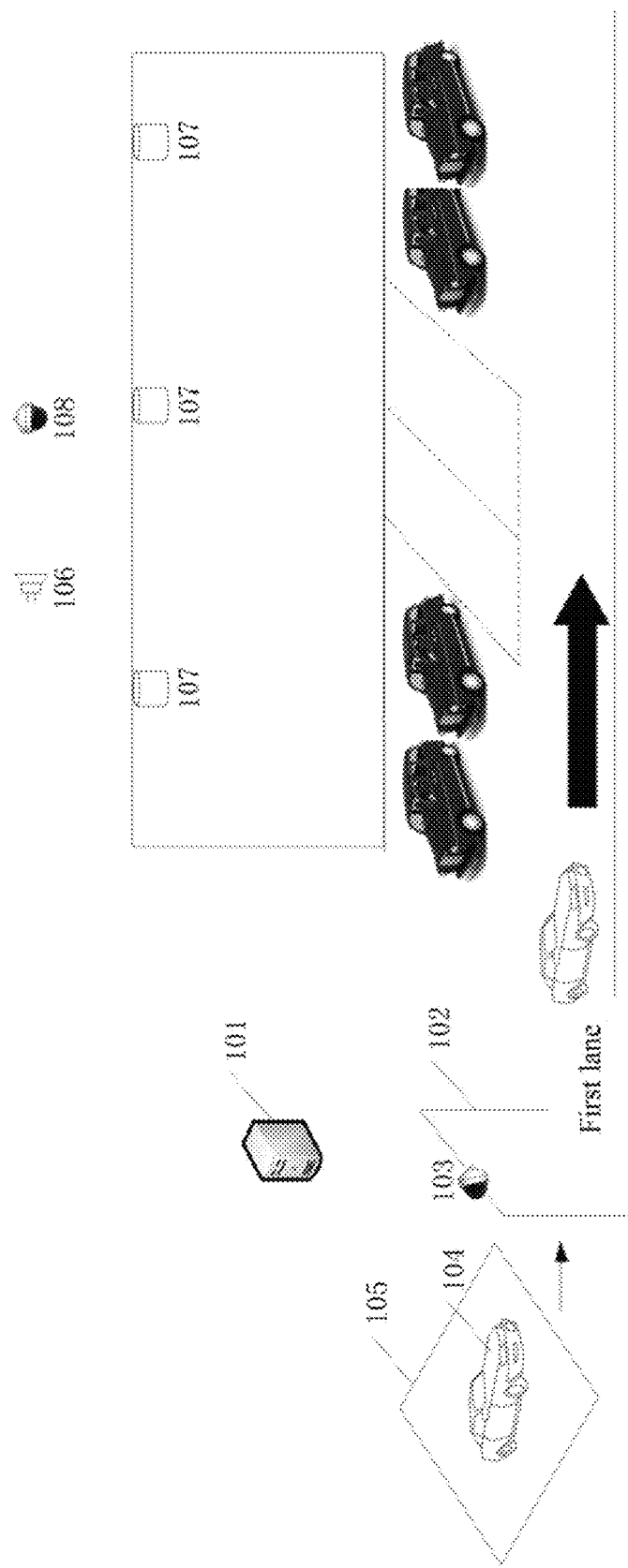
FIG. 1 illustrates a schematic diagram of an environment in which an embodiment of the disclosure is applied.

In the following the implementation process of exemplary embodiments will be described in detail in conjunction with the drawings of the specification. It needs to be noted that, identical or similar reference signs denote identical or similar elements or elements that have identical or similar functions throughout. In the following, the embodiments described with reference to the drawing are exemplary, only used for explaining the invention, and can not be construed as limiting the invention.

To solve the problem of parking difficulty, more parking lots need to be built on one hand, and on the other hand, scientific and technological means are utilized to construct an intelligent parking system. The management of a parking lot generally adopts a manual or semi-manual form, and as the area of the parking lot continuously increases, the number of parking spaces is increasing, and the parking models also tend to be complex, the development of the management systems of parking lots is relatively backward, and it is very difficult for a vehicle driver to rapidly find a suitable parking space because of being unfamiliar with the internal structure and the parking space distribution of the parking lot during the parking process, and a manual assistance guideline is needed. However, the manual assistance will increase labor costs and there exists a certain hidden danger of personal safety. Therefore, a parking space monitoring and vehicle guidance system with a high degree of automation is needed to help with the parking lot management. In addition, there are some blank parking lots that have no fixed parking space frame lines, and this probably gives rise to irregular vehicle parking and thereby wastes the floor space. If a large parking lot is built, the cost is high, the cycle is long and at the same time the management is inconvenient.

Exemplary embodiments provide a parking management system and method, which realize on-demand division and dispatch of vehicles, improve the utilization of a parking lot, and are more flexible, environmentally friendly and convenient. Exemplary embodiments are disclosed by the following technical solutions.

First, reference is made to FIG. 1, which illustrates a schematic diagram of an environment in which an exemplary embodiment is applied. In this environment, a central control device 101 of a parking management system is disclosed, which may be arranged on a local or remote computer or server. An entrance 102 of a parking lot is also illustrated.

In an exemplary embodiment, an entrance camera 103 is arranged, also called a first camera herein, for obtaining the information of an incoming vehicle, for example, the license plate number information, the model information and/or the size information of the vehicle. In an exemplary embodiment, the camera can continuously take photos, and perform the photographing action in a trigger condition. In another example, the camera is in a dormant state, and only performs the photographing action in the trigger condition. In an exemplary embodiment, the trigger condition is based on that a vehicle is detected to be entering at the entrance. This may be based on the pressure detection of a pressure sensor 105 arranged under the entrance position, namely, the position of the vehicle 104. The license plate number information is used for the central control device 101 to uniquely identify a vehicle to implement billing and settlement differently from other vehicles. The size information is used for the central control device 101 to divide and dispatch a parking space of an appropriate size accordingly. The model information is used for the central control device 101 to obtain corresponding size information according to the model and thereby divide and dispatch a parking space of an appropriate size accordingly. The size information may also be sent from the vehicle itself, for example, be told to the entrance 102 of the parking lot through near field communication, Bluetooth and other technologies. The division and dispatch of a parking space may be based on multiple algorithms. In an exemplary embodiment, the central control device 101 pre-divides the remaining parking spaces according to an appropriate proportion configuration (e.g., 1:2:3) of large, medium, and small parking spaces, and in a local range, considers the space utilization factor, and for a certain limited space, pre-divides optimum allocation mode for example by measuring the utilization rate when parking different vehicle model combinations. The pre-division may be dynamically updated or regularly updated with the dynamic change of vehicle parking. It may also be possible that based on the distance factor, the division and dispatch order of parking spaces may be arranged such that the vicinity of the entrance is given a priority or the vicinity of the exit is given a priority, which is in line with the user's general parking habits and makes the parking system more user-friendly, and may perform the dispatch by setting weights for the pre-divided parking spaces according to the distances to the entrance or the exit. In addition, it may further be possible that based on a factor of whether a space is scattered or not, priority is given to dispatching the remaining scattered parking spaces (for example, a separate parking space or parking spaces at both ends), and a whole piece of space is retained for flexible adaptation. The above considerations may be allocated different priority levels according to a first level priority, a second level priority, etc., and different priority levels are allocated weights with different orders of magnitudes for differentiation. For example, if the distance priority is set to be the first level priority, then two-digit weights such as 10, 20, 30, . . . , are allocated according to the distance, and if the scattered property is set to be the second level, then a parking space in a space of a single parking space may be allocated a weight of 5, a parking space in a space of double parking spaces may be allocated a weight of 4, and a parking space in a space of three parking spaces may be allocated a weight of 3, and so on, namely, a single-digit weight. The pre-division of parking spaces may further be combined with human participation, which may thus take into account specific needs, for example, long-term fixed parking spaces.

When a corresponding parking space is divided and dispatched according to the size of a vehicle, in an example, the central control device 101 guides the user to drive to the corresponding parking space via a voice prompt of a speaker 106 or via an image prompt (e.g., an arrow as shown) of a projection device 107. The number of projection devices 107 may be set flexibly. For example, for fixed projection devices, it may be such that one projection device 107 is in charge of two or even three parking spaces. Or, the projection device is arranged on a slide rail 109, such that it can be controlled by the central control device 101 to move on the slide rail 109 and project, which may thus greatly reduce the number of arranged projection devices and thereby decrease the cost. The function of the projection device 107 is primarily to identify the range of a parking space, in order that a vehicle to be parked currently drives into the range. In an exemplary embodiment, the projection device further alerts the wrong parking, for example, reminds the user with a bright color or by way of flickering. In the environment, a monitoring camera 108 is further arranged above a parking space, which camera primarily plays the role of monitoring and may continuously photograph and transmit images back to the central control device 101. The monitoring camera 108 may be a panoramic camera, a dome camera, an infrared camera, etc. In an indoor parking lot, the light is generally dim during the day, and the camera for monitoring preferably needs low illumination; and car lights illuminate frequently at night, and the camera for monitoring preferably needs to have a basic strong light suppression function. In an outdoor parking lot, the range is large, the scene is complex, the illumination is different during the day from at night, and in general, a primary selection of a monitoring ball camera of dynamic bandwidth technology is more suitable, which can meet the monitoring requirements for a large range of points and surfaces and near and far distances and 360-degree rotation. For such cameras, their arrangement density in a parking lot may be greatly reduced, for example, as shown in FIG. 1, 6 parking spaces on one side of the first lane share one camera. The monitoring camera 108 can feed the actual parking situation back to the central control device 101 for further processing, for example, detection of whether the parking is correct or not, or further allocation of parking spaces for other vehicles. The central control device 101 updates its pre-division of parking spaces according to the feedback from the monitoring camera 108.

Figure 2:
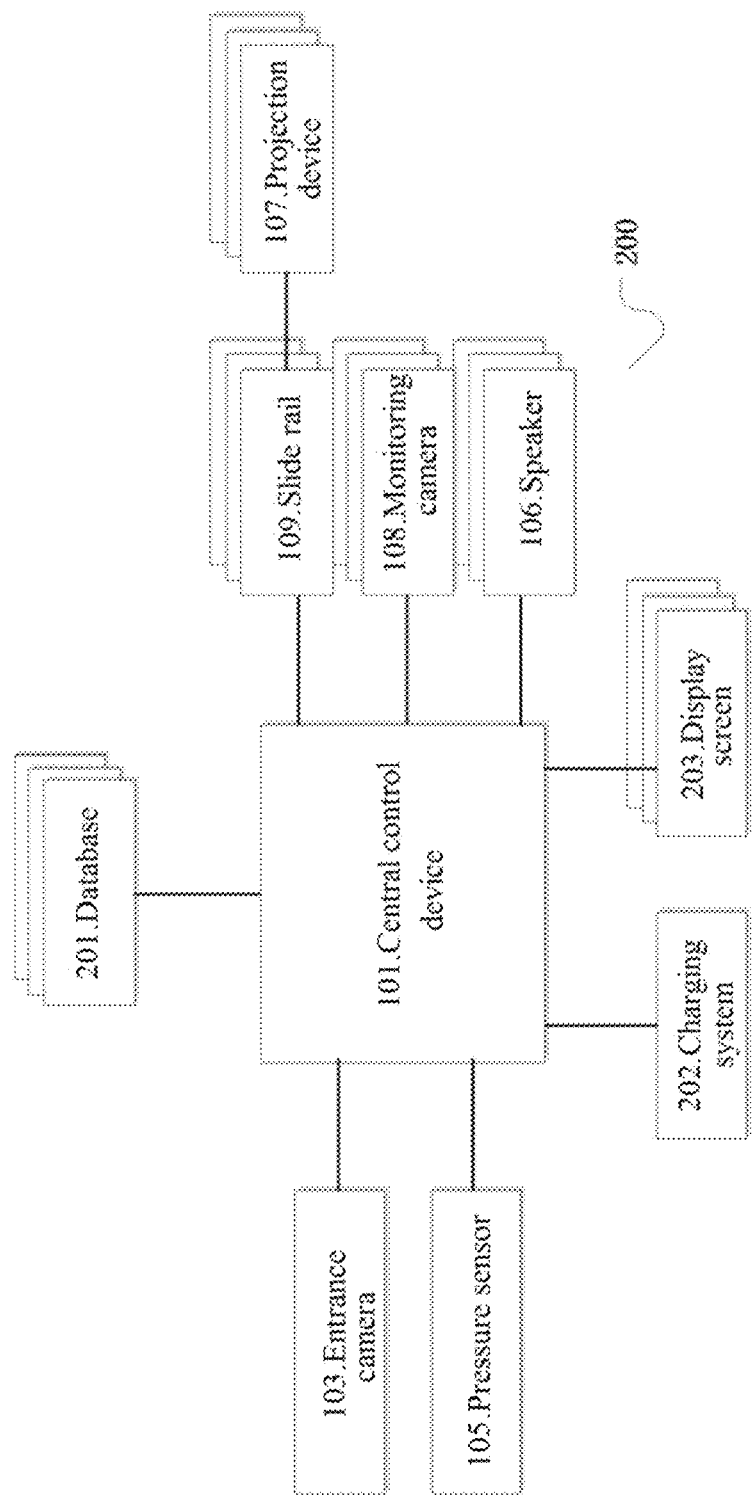
FIG. 2 illustrates a block diagram of a parking management system according to an embodiment of the disclosure.

FIG. 2 illustrates a block diagram of a parking management system 200 according to an exemplary embodiment. The parking management system 200 includes: a central control device 101, an entrance camera 103, a pressure sensor 105, one or more slide rail 109, one or more projection device 107, one or more monitoring camera 108 (also called a second camera), one or more speaker 106, one or more database 201, a charging system 202, and one or more display screen 203.

The central control device 101 is configured to centrally manage the division and dispatch of parking spaces, the one or more projection device 107 is configured to project and display the range of the parking space of a vehicle to be parked (e.g., the vehicle 104 at the entrance in FIG. 1) to assist the parking of the vehicle to be parked in response to the division and dispatch of the parking spaces by the central control device 101.

In an exemplary embodiment, at the entrance of the parking lot is arranged an entrance camera 103. In an example, the entrance camera 103 is configured to obtain the size information of an incoming vehicle, and the size information is provided to the central control device 101 so as to divide and dispatch a parking space accordingly based on the size information of the incoming vehicle. For example, for a medium-sized vehicle, a relatively large parking space is allocated, whereas for a small-sized vehicle with two seats, for example, scattered spaces such as corners and edges may be flexibly utilized to allocate a relatively small parking space. This helps to make full use of the space of the parking lot and improve the utilization. In another example, the entrance camera 103 is configured to obtain the model information of an incoming vehicle, the model information is provided to the central control device 101, the central control device 101 can access a database 201 in which is stored a mapping table between the model information and the size information of vehicles, and therefore, the central control device 101 can obtain the size information of the vehicle according to the model information of the vehicle, and thereby divide and dispatch a parking space accordingly. The database 201 may be located locally, and preferably, the database 201 may also be located in the cloud. In the block diagram of FIG. 2, a situation in which there is only one entrance camera 103 is shown generally, and for a parking lot with multiple entrances, the embodiment may be configured with multiple entrance cameras 103. In general, the entrance camera has a function of automatically recognizing a license plate number and can transmit the recognized license plate number to the central control device 101. In this embodiment, the entrance camera 103 further has a function of automatically recognizing the model of a vehicle or a function of automatically recognizing the size of a vehicle, which needs to add a corresponding algorithm module in the entrance camera 103. By changing an optical image signal into an electrical signal, it is also convenient to store and transfer it. Of course, the recognition of the model or size information of a vehicle may also be accomplished by the central control device 101.

In an exemplary embodiment, a pressure sensor 105 may further be arranged at the entrance of the parking lot, which is configured for detecting whether there is a vehicle entering. When it is detected that there is a vehicle entering, in an example, the pressure sensor 105 may be in direct communication with the entrance camera 103 to trigger the entrance camera 103 to obtain the information of the incoming vehicle, for example, perform a photographing action, and optionally perform recognition of corresponding information (the size information, the model information, etc.); and in another example, the pressure sensor 105 may further inform the central control device 101 via a communication interface that there is a vehicle entering, and the central control device 101 triggers the entrance camera 103. In the block diagram of FIG. 2, a situation in which there is only one pressure sensor 105 is shown generally, and for a parking lot with multiple entrances, the exemplary embodiment may be configured with multiple pressure sensors 105.

In an exemplary embodiment, the incoming vehicle may directly send its own size information to the parking management system for example on request via a communication interface, such as via Bluetooth or near-field communication, etc., or send its own model information and then the central control device 101 further obtains the size information of the vehicle by querying the database 201.

In an embodiment, when completing the division and dispatch of parking spaces, the central control device 101 issues a voice instruction to a user via one or more speaker 106, for example, "Please go straight", "Enter the first lane", "Please turn left", "Project and display a parking space ahead", and the like, and/or gives a user a projection indication via one or more projection device 107, for example, projection of various arrows and texts. Such a parking mode of system automatic dispatch and guidance saves a large amount of manpower for the parking lot and improves the parking safety and efficiency.

In an exemplary embodiment, the projection device 107 may be arranged per parking space, or one projection device is arranged every two or three parking spaces. For example, when one projection device 107 is arranged every two parking spaces, the projection device 107 can project two parking spaces simultaneously for selection by the user. Of course, it may also be possible to project and display one parking space. In an embodiment, the projection device 107 may be arranged on a track and can move freely, thereby may operate in a larger range and perform projection and display for more parking spaces. In this way, the number of projection devices can be reduced and the cost is thus saved.

Figure 4:
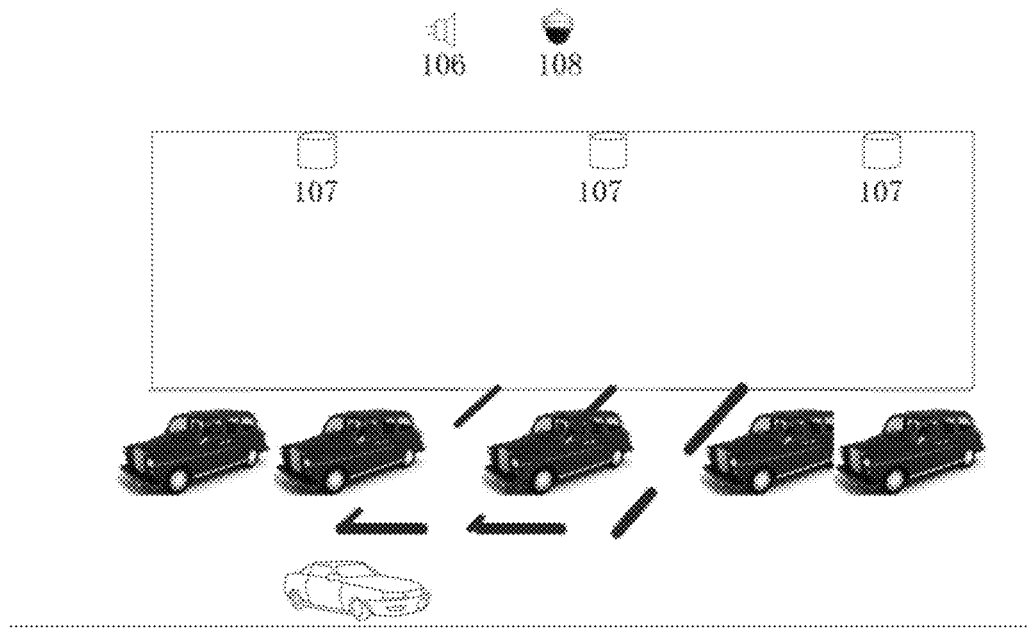
FIG. 4 illustrates a projection diagram according to an embodiment of the disclosure.

In an exemplary embodiment, one or more monitoring camera 108 is arranged near a parking space, which is configured to obtain the actual parking position of the vehicle. The central control device 101 can determine whether the vehicle is parked correctly based on the actual parking position of the vehicle and the previous division and dispatch of parking spaces, and may record for a vehicle which does not follow the instruction and occupies 2 or more parking spaces, and for example perform billing according to twice or multiple times the cost accordingly when billing occurs at the end of parking, thereby regulating the parking management and guiding the user to park regularly in the future. After the irregular parking of a user is fed back to the central control device 101 via the monitoring camera 108, it may further assist the central control device in correctly mastering the remaining parking space information of the parking lot, so as to correctly divide and dispatch parking spaces for subsequently entering vehicles. In this embodiment, when a user does not follow the instruction and occupies two or more parking spaces, for example, as shown by the vehicle right in the middle of the projection diagram according to an embodiment of the disclosure as shown in FIG. 4, the central control device 101 may instruct the projection device 107 to display an alert to the user, for example, prompt the user by bold and bright red flickering display, or also may instruct the speaker 106 to conduct a voice alert to the user. After that, after timing for a period of time, if the user has not corrected, billing starts to be performed according to twice or multiple times the cost accordingly. Based on the user's right to know, the billing mode needs to be told to the user in advance in an appropriate way, for example, identified at an apparent position of the parking lot, or told to the user by way of projection and/or voice prompt when the user stops in the parking space, or the like.

When the vehicle pulls out the exit of the parking lot, the parking finishes, and the charging system 202 displays and/or charges the fee, which will not be described in detail here any longer. At the exit of the parking lot may further be arranged one or more display screen 203, which may display the traffic and display when retrieving a previous monitoring image, to assist the administrator in query.

Figure 3A:
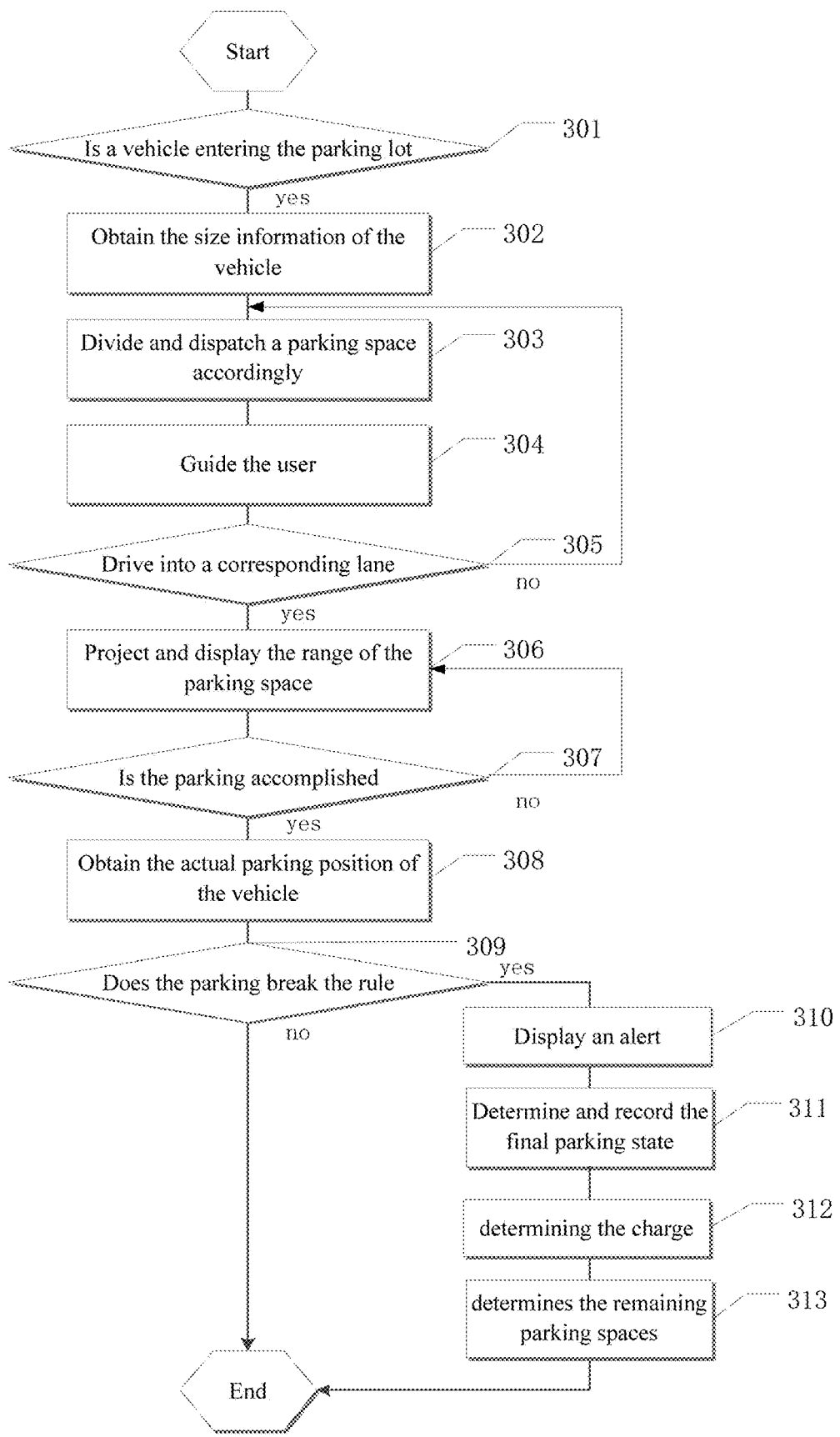
FIG. 3A illustrates a flow chart of a parking management method according to an embodiment of the disclosure.
Figure 3B:
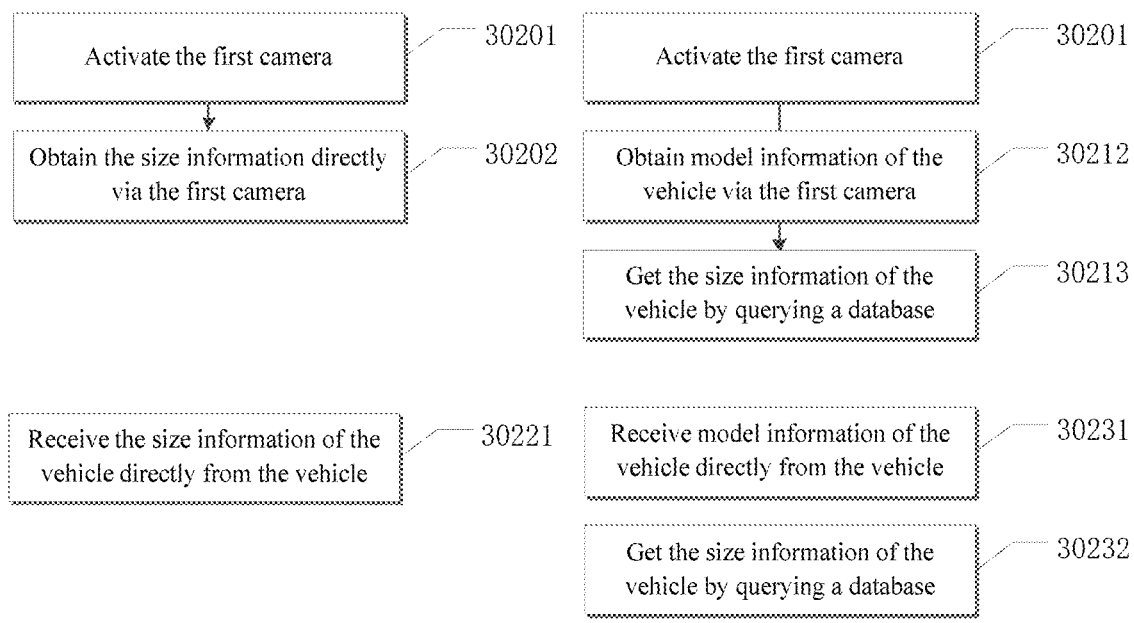
FIG. 3B illustrates several flow charts of obtaining size information of a vehicle.

FIG. 3A and FIG. 3B illustrate the steps of a parking management method according to an exemplary embodiment. At step 301, a pressure sensor 105 of a parking management system detects whether there is a vehicle entering. At step 302, the size information of the vehicle is obtained. In an example, the entrance camera 103 obtains the size information of the vehicle at step 30202. In another example, the model information of the vehicle is first obtained via the entrance camera 103 at step 30212, and then a central control device 101 gets the size information of the vehicle by querying a database 201 at step 30213. In the above two examples, the entrance camera 103 is activated at step 30201 in response to the detection of step 301 that there is a vehicle entering. In still another example, size information of the vehicle is received directly from the vehicle at 30221, or model information of the vehicle is received directly from the vehicle at step 30231, and the central control device 101 gets the size information of the vehicle by querying the database 201 at step 30232. For details of obtaining the size information of the vehicle, please see FIG. 3B. At step 303, the central control device 101 divides and dispatches a parking space accordingly based on the size information of the vehicle to be parked. At step 304, the central control device 101 guides the user via a speaker 106 and/or projection device 107. At step 305, it is judged whether the vehicle drives into a corresponding lane. If no, the method returns to the step 303 to re-divide a parking space. If yes, the method proceeds to step 306 at which the projection device 107 projects and displays the range of the parking space to assist the parking of the vehicle. At step 307, it is detected whether the parking of the vehicle is accomplished. Here, multiple algorithms may be set. In an example, it may be determined according to the user leaving the vehicle. In another example, certain time may be set for timing, and the end of the timing may be considered as the user having accomplished the parking. In still another example, it may be determined according to the user's vehicle having completely entered the range of the parking space. When the parking is not accomplished, the step 306 is performed continuously to project and display the range of the parking space. When the parking is accomplished, step 308 is performed, at which a monitoring camera 108 obtains the actual parking position of the vehicle. At step 309, the central control device 101 determines whether the parking of the vehicle breaks the rule based on the actual parking position of the vehicle and the division and dispatch of parking spaces. If yes, step 310 is performed to cause the projection device to display an alert, for example, cause the projection lines to be thickened and/or flickering and/or changed into a bright color. At step 311, the final parking state is determined and recorded for determining the charge at step 312 and subsequently determines the remaining parking spaces based on the actual parking position of the vehicle in order to divide and dispatch other parking spaces at step 313, and the method ends.

The beneficial effects of the exemplary embodiments are as follows: the parking is assisted based on projection and display, which may eliminate the setting of fixed parking space frame lines, and is both environmentally friendly and more flexible; based on the obtaining of the size information of a vehicle, on-demand division and dispatch may be achieved and the space is saved; based on the monitoring and feedback of the second camera, it is helpful to regulating and facilitating the parking space management; based on the dispatch indication of a parking space, it is helpful to improving the parking efficiency; based on arranging the projection device on a track, it is helpful to reducing the number of projection devices and improving the apparatus utilization; and the first camera is activated based on the detection of the pressure sensor, which is helpful to extending the life of the camera and better maintenance of the equipment.

It may be appreciated by a person of ordinary skill in the art that a drawing is just a schematic diagram of an exemplary embodiment, and the modules or flow in the drawing are not necessarily required to implement the invention.

It may be appreciated by a person of ordinary skill in the art that modules in a device in an exemplary embodiment may be distributed in the device of the exemplary embodiment according to the description of the exemplary embodiment, or also may change accordingly to be located in one or more device different from the embodiment. The modules of the exemplary embodiment may be combined into one module, or also may further be split into multiple sub-modules.

In the description of the above exemplary embodiments, specific features, structures or characteristics may be combined in a suitable way in any one or more of the embodiments or examples, and various techniques may be described in a general context of software, hardware, elements or program modules. In general, the modules include routines, programs, objects, elements, components, and data structures, etc., which perform specific tasks or implement specific abstract data types. Features of the techniques described herein are independent of the platform, which means that the techniques may be embodied on various platform having various processors or circuits.

Clearly, various modifications and variations may be made to the invention by those of ordinary skill in the art without departing from the spirit and scope of the invention. As such, the invention is also intended to include such modifications and variations, if the modifications and variations of the invention pertain to the scope of the claims of the invention and the equivalent thereof.

The invention claimed is:

1. A parking management system, including:
a central control device configured to centrally manage division and dispatch of a parking space;

at least one projection device configured to project and display a range of the parking space to assist parking of a vehicle in response to the division and dispatch of the parking space by the central control device;
a first camera configured to obtain model information of the vehicle; and
a database, having stored therein, a mapping table between model information and size information of vehicles;
wherein the central control device obtains corresponding size information from the database based on the model information of the vehicle and divides and dispatches the parking space based on the size information of the vehicle.

2. The parking management system as claimed in claim 1, further including:
the first camera configured to obtain the size information of the vehicle;
wherein the central control device divides and dispatches the parking space based on the size information of the vehicle.

3. The parking management system as claimed in claim 2, further including:
a pressure sensor configured to detect whether there is the vehicle entering;
wherein in response to the detection that there is the vehicle entering, the first camera is activated to obtain the information of the vehicle.

4. The parking management system as claimed in claim 1, wherein the central control device is further configured to directly obtain from the vehicle its size information, or obtain from the vehicle its model information, and further obtain corresponding size information from the database based on the model information of the vehicle, wherein the database stores a mapping table between model information and size information of vehicles; and divide and dispatch the parking space based on the size information of the vehicle.

5. The parking management system as claimed in claim 1, further including:
a second camera configured to obtain an actual parking position of the vehicle;
wherein the central control device determines charge for the vehicle based on the actual parking position of the vehicle and the division and dispatch of the parking space.

6. The parking management system as claimed in claim 5, wherein the central control device determines remaining parking spaces based on the actual parking position of the vehicle in order to divide and dispatch other parking spaces.

7. The parking management system as claimed in claim 5, wherein when determining that the vehicle is not in the range of the parking space, the central control device causes the projection device to display an alert.

8. The parking management system as claimed in claim 1, wherein the dispatch instructs a user via sound or image.

9. The parking management system as claimed in claim 1, wherein the projection device is arranged to be movable on a track to project and display different parking spaces.

10. The parking management system as claimed in claim 1, wherein the central control device performs pre-allocation of parking spaces for remaining parking spaces based on multiple factors, wherein priority weights with different orders of magnitude are set for different factors to determine the allocation order of the remaining parking spaces.

11. A parking management method, including:
dividing and dispatching a parking space by a central control device;
projecting and displaying range of the parking space by a projection device to assist parking of a vehicle in response to the division and dispatch of the parking space; and
a first camera obtaining model information of the vehicle; and
the central control device obtaining corresponding size information from a database based on the model information of the vehicle and dividing and dispatching the parking space based on the corresponding size information of the vehicle, wherein the database stores a mapping table between model information and size information of vehicles.

12. The parking management method as claimed in claim 11, further including:
the first camera obtaining the size information of the vehicle; and
the central control device dividing and dispatching the parking space based on the size information of the vehicle.

13. The parking management method as claimed in claim 12, further including:
a pressure sensor detecting whether there is the vehicle entering; and
in response to the detection that there is the vehicle entering, activating the first camera to obtain the information of the vehicle.

14. The parking management method as claimed in claim 11, further including:
the central control device obtaining from the vehicle its size information, or the central control device directly obtaining from the vehicle its model information, and further obtaining corresponding size information from the database based on the model information of the vehicle, wherein the database stores a mapping table between model information and size information of vehicles; and dividing and dispatching the parking space based on the size information of the vehicle.

15. The parking management method as claimed in claim 11, further including:
a second camera obtaining an actual parking position of the vehicle; and
the central control device determining charge for the vehicle based on the actual parking position of the vehicle and the division and dispatch of the parking space.

16. The parking management method as claimed in claim 15, wherein when determining that the vehicle is not in the range of the parking space, the central control device causes the projection device to display an alert.

17. The parking management method as claimed in claim 11, wherein the central control device determines remaining parking spaces based on the actual parking position of the vehicle in order to divide and dispatch other parking spaces.

18. The parking management method as claimed in claim 11, wherein the dispatch instructs a user via sound or image.

* * * * *